US012614316B2

(12) United States Patent
Atzmon et al.

(10) Patent No.: US 12,614,316 B2
(45) Date of Patent: Apr. 28, 2026

(54) TEXT-TO-IMAGE DIFFUSION MODEL WITH COMPONENT LOCKING AND RANK-ONE EDITING

(71) Applicant: NVIDIA Corporation, Santa Clara, CA (US)

(72) Inventors: Yuval Atzmon, Hod Hasharon (IL); Yoad Tewel, Tel Aviv-Jaffa (IL); Rinon Gal, Tel Aviv (IL); Gal Chechik, Ramat Hasharon (IL)

(73) Assignee: NVIDIA CORPORATION, Santa Clara, CA (US)

( * ) Notice: Subject to any disclaimer, the term of this patent is extended or adjusted under 35 U.S.C. 154(b) by 309 days.

(21) Appl. No.: 18/385,840

(22) Filed: Oct. 31, 2023

(65) Prior Publication Data

US 2024/0249446 A1 Jul. 25, 2024

Related U.S. Application Data

(60) Provisional application No. 63/440,655, filed on Jan. 23, 2023.

(51) Int. Cl.
| | |
|---|---|
| *G06T 11/00* | (2026.01) |
| *G06T 7/10* | (2017.01) |
| *G06V 10/24* | (2022.01) |

(52) U.S. Cl.
CPC ................ *G06T 11/00* (2013.01); *G06T 7/10* (2017.01); *G06V 10/24* (2022.01)

(58) Field of Classification Search
CPC ........... G06T 11/00; G06T 7/10; G06V 10/24; G06V 10/82
See application file for complete search history.

(56) References Cited

U.S. PATENT DOCUMENTS

| | | | | |
|---|---|---|---|---|
| 2018/0268255 A1* | 9/2018 | Surazhsky | ............... | G06N 3/08 |
| 2024/0296596 A1* | 9/2024 | Aberman | ............... | G06V 10/82 |

OTHER PUBLICATIONS

Hertz, Amir, et al. "Prompt-to-prompt image editing with cross attention control." arXiv preprint arXiv:2208.01626 (2022) (Year: 2022).*

(Continued)

*Primary Examiner* — Daniel F Hajnik
*Assistant Examiner* — Chris Alejandro Puntier
(74) *Attorney, Agent, or Firm* — Zilka-Kotab, P.C.

(57) ABSTRACT

A text-to-image machine learning model takes a user input text and generates an image matching the given description. While text-to-image models currently exist, there is a desire to personalize these models on a per-user basis, including to configure the models to generate images of specific, unique user-provided concepts (via images of specific objects or styles) while allowing the user to use free text "prompts" to modify their appearance or compose them in new roles and novel scenes. Current personalization solutions either generate images with only coarse-grained resemblance to the provided concept(s) or require fine tuning of the entire model which is costly and can adversely affect the model. The present description employs component locking and/or rank-one editing for personalization of text-to-image diffusion models, which can improve the fine-grained details of the concepts in the generated images, reduce the memory footprint update of the underlying model instead of full fine-tuning, and reduce adverse effects to the model.

21 Claims, 10 Drawing Sheets

(56) References Cited

OTHER PUBLICATIONS

Choi, Jooyoung, et al. "Perception prioritized training of diffusion models." Proceedings of the IEEE/CVF conference on computer vision and pattern recognition. 2022. (Year: 2022).*

Rombach, Robin, et al. "High-resolution image synthesis with latent diffusion models." Proceedings of the IEEE/CVF conference on computer vision and pattern recognition. 2022. (Year: 2022).*

Lee, Dong-Hyun, et al. "Difference target propagation." Joint european conference on machine learning and knowledge discovery in databases. Cham: Springer International Publishing, 2015. (Year: 2015).*

Gai et al., "An Image is Worth One Word: Personalizing Text-to-Image Generation using Textual Inversion," arXiv, 2022, 26 pages, retrieved from https://textual-inversion.github.io/.

Ruiz et al., "DreamBooth: Fine Tuning Text-to-Image Diffusion Models for Subject-Driven Generation," arXiv, 2023, 25 pages, retrieved from https://dreambooth.github.io/.

Dong et al., "DreamArtist: Towards Controllable One-Shot Text-to-Image Generation via Positive-Negative Prompt-Tuning," arXiv, 2023, 10 pages, retrieved from https://arxiv.org/abs/2211.11337.

Kumari et al., "Multi-Concept Customization of Text-to-Image Diffusion," arXiv, 2023, 26 pages, retrieved from https://www.cs.cmu.edu/~custom-diffusion/.

Github, "LoRA," GitHub, 2023, 15 pages, retrieved from https://github.com/cloneofsimo/lora.

Meng et al., "Locating and Editing Factual Associations in GPT," arXiv, 2023, 35 pages, retrieved from https://rome.baulab.info/.

* cited by examiner

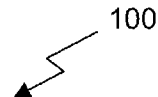

100 receiving as input at least one image of a concept to be learned
by a pre-trained text-to-image diffusion model, wherein the
concept is associated with a super category of concepts on which
the text-to-image diffusion model has been pre-trained
102 training the text-to-image diffusion model to generate new images
of the concept, including:
        computing an activation of at least one select
component of the text-to-image diffusion model for the
super category, and
        while locking the activation of the at least one select
component, updating weights of the text-to-image diffusion
model based on the at least one image of the concept
104

*Fig. 1*

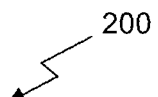

200 receiving as input at least one image of a concept to be learned
by a pre-trained text-to-image diffusion model
202 training the text-to-image diffusion model to
generate new images of the concept, including, for at least
one layer of the text-to-image diffusion model:
propagating the input forward through the text-to-
image diffusion model to determine a propagated input to
the layer,
propagating a defined output backward through the
text-to-image diffusion model to determine a target output
for the layer, and
updating weights of the layer such that when the
weights are applied to the propagated input a resulting
output of the layer is more closely aligned with the target
output
204

*Fig. 2*

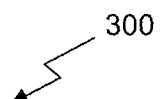

300 receiving as input at least one image of a concept to be learned
by a pre-trained text-to-image diffusion model
302 training the text-to-image diffusion model to generate new
images of the concept, including:
while updating weights of the text-to-image diffusion
model based on the at least one image of the concept, a
standard conditional diffusion loss is weighed by a soft
segmentation mask
304

*Fig. 3*

DATA CENTER
900
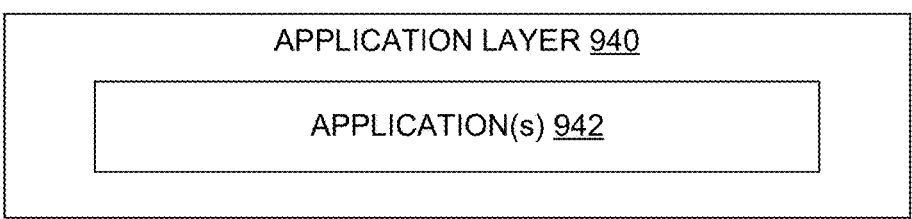
APPLICATION LAYER 940
APPLICATION(s) 942
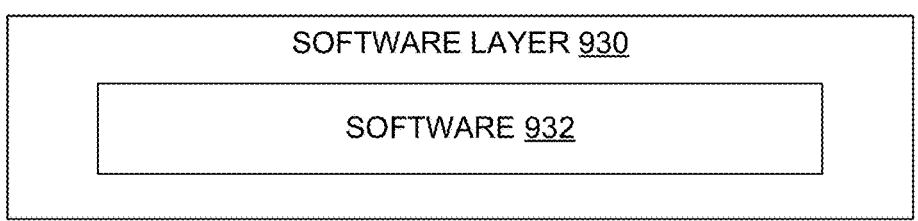
SOFTWARE LAYER 930
SOFTWARE 932
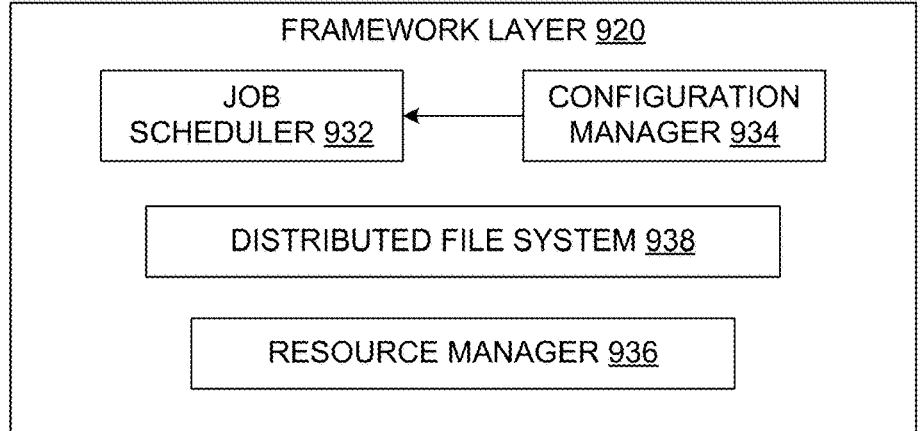
FRAMEWORK LAYER 920
JOB SCHEDULER 932 ← CONFIGURATION MANAGER 934
DISTRIBUTED FILE SYSTEM 938
RESOURCE MANAGER 936
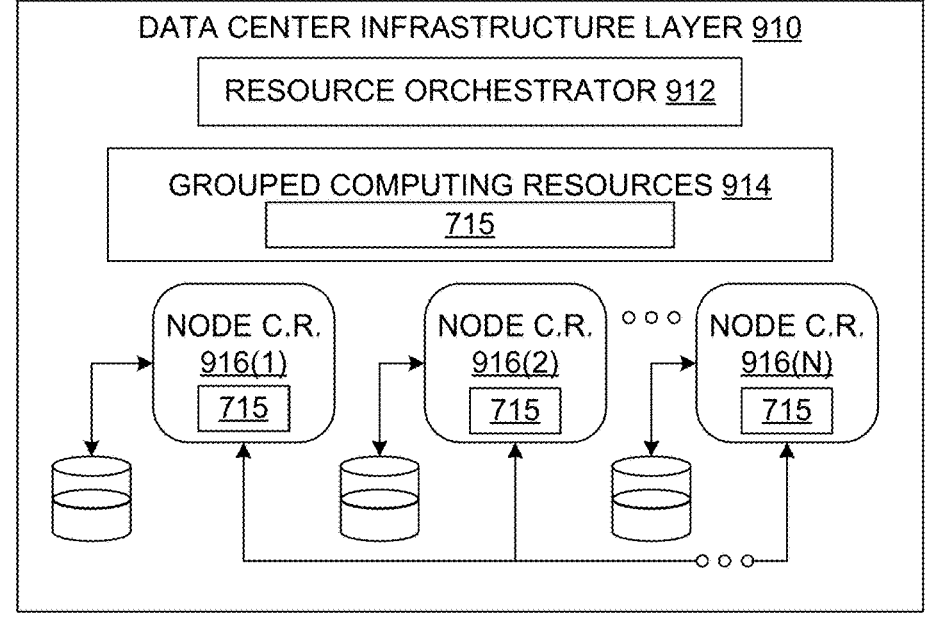
DATA CENTER INFRASTRUCTURE LAYER 910
RESOURCE ORCHESTRATOR 912
GROUPED COMPUTING RESOURCES 914
715
NODE C.R. 916(1)
715
NODE C.R. 916(2)
715
○ ○ ○
NODE C.R. 916(N)
715
*Fig. 9*

TEXT-TO-IMAGE DIFFUSION MODEL WITH COMPONENT LOCKING AND RANK-ONE EDITING

CLAIM OF PRIORITY

This application claims the benefit of U.S. Provisional Application No. 63/440,655 titled "PERSONALIZING TEXT-TO-IMAGE MODELS USING RESTRICTED MODEL EDITING," filed Jan. 23, 2023, the entire contents of which is incorporated herein by reference.

TECHNICAL FIELD

The present disclosure relates to text-to-image models.

BACKGROUND

A text-to-image model is a machine learning model which takes as input a natural language description (i.e. a user input text) and generates an image (i.e. computer graphic) matching that description. While text-to-image models currently exist, there is a desire to personalize these models on a per-user basis. Personalization of text-to-image models is the task of generating images of specific, unique user-provided concepts (like objects or styles) and allowing the user to use free text "prompts" to modify their appearance or compose them in new roles and novel scenes. In simple terms, a user provides a few training examples (e.g. example images) of a specific concept. Then, a personalization algorithm allows learning to employ this concept with a pre-trained text-to-image model and diverse prompts.

However, there are limitations of existing solutions for personalizing text-to-image models. For example, some text inversion based approaches, which learn a new word embedding vector for each concept while keeping the text-to-image model frozen, result in learned concepts that only have coarse-grained resemblance to the training examples as well as situations where compositionality with free form text does not work. Similarly, other text inversion approaches, which learn two embeddings per concept (i.e. a new word embedding vector for each concept and a word embedding which is applied in a negative prompt), also have coarse-grained resemblance to the training examples.

As another example, approaches which fine tune the whole text-to-image model, such as with a regularization term and very low learning rate, exhibit a very large memory or storage footprint update for the complete finetuned model for every concept, typically do not allow for combining multiple concepts since a different model is learned for each concept, and are prone to adversely affecting the underlying text-to-image model in unknown ways (e.g. leakage, catastrophic forgetting, etc.). Even approaches that only fine-tune the cross-attention key and value layers instead of the entire model also exhibit similar limitations, such as large update footprint, no support for continual learning, ability to only combine concepts that were jointly trained at the same session, and adverse impact on the underlying text-to-image model.

Another issue in existing solutions is overfitting. Essentially, once an approach has learned a particular concept, it becomes difficult to modify that concept by simply changing the input text prompt.

There is a need for addressing these issues and/or other issues associated with the prior art. For example, there is a need to employ component locking and/or rank-one editing for personalization of text-to-image diffusion models, as described in the following embodiments, which can improve the fine-grained details of generated images compared to textual-inversion without sacrificing compositionality using free-form text, which can reduce the memory footprint update of the underlying model instead of full fine-tuning, and which can reduce catastrophic forgetting and leakage.

SUMMARY

A method, computer readable medium, and system are disclosed to provide for personalization of text-to-image diffusion models. In an embodiment, at least one image of a concept to be learned by a pre-trained text-to-image diffusion model is received as input, wherein the concept is associated with a super category of concepts on which the text-to-image diffusion model has been pre-trained. The text-to-image diffusion model is trained to generate new images of the concept, including: computing an activation of at least one select component of the text-to-image diffusion model for the super category, and while locking the activation of the at least one select component, updating weights of the text-to-image diffusion model based on the at least one image of the concept.

In another embodiment, at least one image of a concept to be learned by a pre-trained text-to-image diffusion model is received as input. The text-to-image diffusion model is trained to generate new images of the concept, including, for at least one layer of the text-to-image diffusion model: propagating the input forward through the text-to-image diffusion model to determine a propagated input to the layer, propagating a defined output backward through the text-to-image diffusion model to determine a target output for the layer, and updating weights of the layer such that when the weights are applied to the propagated input a resulting output of the layer is more closely aligned with the target output than would be if the weights were not updated.

In yet another embodiment, at least one image of a concept to be learned by a pre-trained text-to-image diffusion model is received as input. The text-to-image diffusion model is trained to generate new images of the concept, including: while updating weights of the text-to-image diffusion model based on the at least one image of the concept, a standard conditional diffusion loss is weighed by a soft segmentation mask.

BRIEF DESCRIPTION OF THE DRAWINGS

FIG. 1 illustrates a flowchart of a method for personalization of a text-to-image diffusion model using component locking, in accordance with an embodiment.

FIG. 2 illustrates a flowchart of a method for personalization of a text-to-image diffusion model using rank-one editing, in accordance with an embodiment.

FIG. 3 illustrates a flowchart of a method for personalization of a text-to-image diffusion model using a weighed loss, in accordance with an embodiment.

FIG. 9 illustrates an example data center system, according to at least one embodiment.

DETAILED DESCRIPTION

Figure 4:
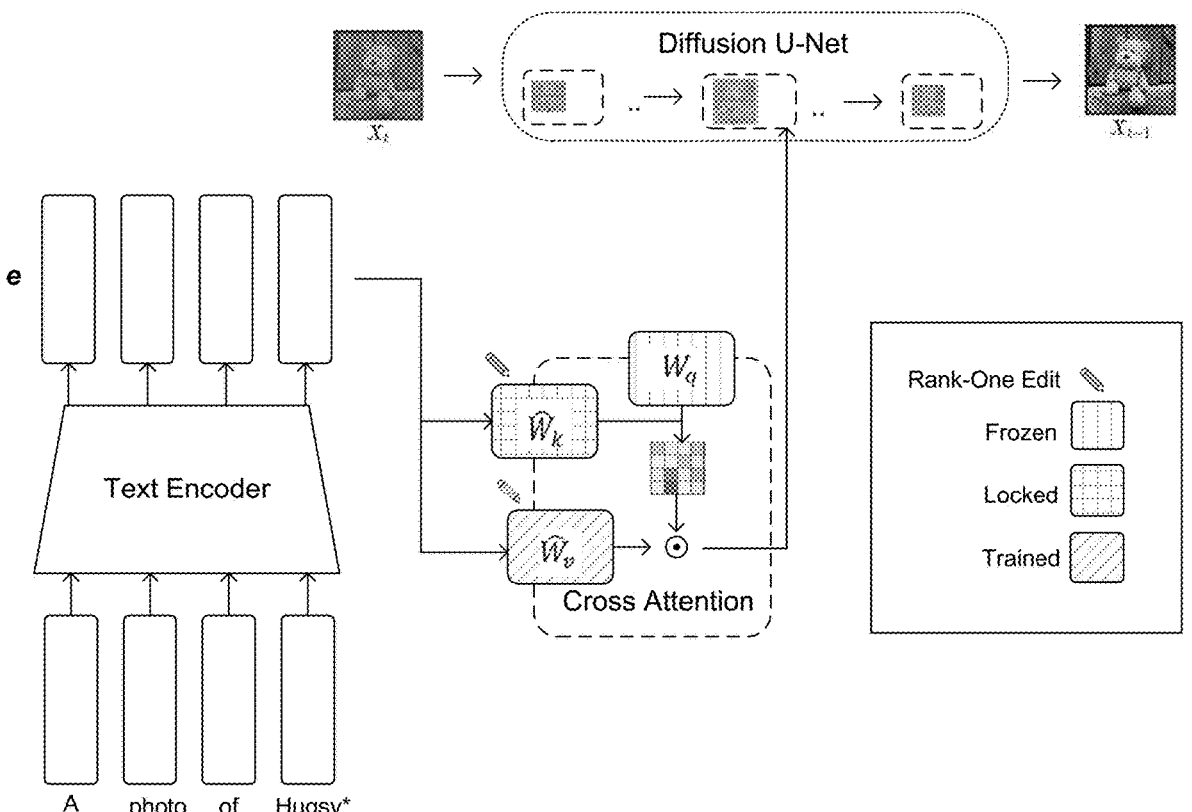
FIG. 4 illustrates a block diagram of the architecture for personalizing a text-to-image diffusion model, in accordance with an embodiment.

FIG. 1 illustrates a flowchart of a method 100 for personalization of a text-to-image diffusion model using component locking, in accordance with an embodiment. The method 100 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, at least one image of a concept to be learned by a pre-trained text-to-image diffusion model is received as input, where the concept is associated with a super category of concepts on which the text-to-image diffusion model has been pre-trained. The pre-trained text-to-image diffusion model refers to a machine learning model that has been trained on at least one category of concepts, in particular to generate images having those objects from user input text. The user input text is given, at least in part, in a natural language. In an embodiment, the user input text includes a description of an image to be generated by the model.

As mentioned, at least one image of a concept to be learned by the pre-trained text-to-image diffusion model is received as input. In an embodiment, the image(s) is received by a user. In an embodiment, the image is received to personalize the pre-trained text-to-image diffusion model for the user, and in particular to train the pre-trained text-to-image diffusion model to be able to generate images of the concept introduced by the user.

The concept refers to a specific object, group of objects, scene, or other feature capable of being learned by the pre-trained text-to-image diffusion model. Accordingly, the concept may be a "new" concept on which the pre-trained text-to-image diffusion model has not yet been trained. In the context of the present description, the concept is associated with a super category (also referred to herein as a super class) of concepts on which the text-to-image diffusion model has already been pre-trained. In other words, the new concept is of a feature that is a sub-category of a super category of concepts on which the text-to-image diffusion model has already been pre-trained.

Just by way of example, where the text-to-image diffusion model has been pre-trained to generate images of teddy bears (super category is "teddy bears"), the new concept may be a specific (i.e. individual) teddy bear. As another example, where the text-to-image diffusion model has been pre-trained to generate images of cats (super category is "cats"), the new concept may be a specific cat. As another example, where the text-to-image diffusion model has been pre-trained to generate images of a general concept of a big white dog (e.g. super category is "big white dog"), the new concept may be a specific big white dog. In an embodiment, the super category includes a description of the super category.

In an embodiment, the input includes a plurality of images of the concept. For example, each image may include a different (camera) view of the concept, in which case each image may capture a different portion (e.g. side, etc.) of the concept. In another embodiment, the input includes a single image of the concept. In an embodiment, the input includes both the image(s) of the concept to be learned and a text input indicating (e.g. describing) the concept to be learned. The text input indicating the concept to be learned may include a name for the concept to be learned.

In operation 104, the text-to-image diffusion model is trained to generate new images of the concept. In part, the training includes computing an activation of at least one select component of the text-to-image diffusion model for the super category. The select component refers to any component of the text-to-image diffusion model for which an activation can be computed for the super-category. In an embodiment, the select component is activity at an output of a feed-forward layer of a cross-attention module of the text-to-image diffusion model. In an embodiment, activation of a single select component is computed. In another embodiment, activations of two or more select components are computed.

In an embodiment, the activation of the select component refers to the activation at an output of a K matrix of a cross-attention module of the text-to-image diffusion model. As mentioned, the activation of the select component is computed for the super category. Thus, the activation is computed in the text-to-image diffusion model which has been pre-trained on the super category. In an embodiment, the activation of the select component is computed based upon an input text prompt indicating the super category.

In part, the training of the text-to-image diffusion model to generate new images of the concept also includes updating weights of the text-to-image diffusion model based on the at least one image of the concept, while locking the activation of the at least one select component. In an embodiment, the weights of the text-to-image diffusion model are updated, while locking the activation of the at least one select component, based upon an input text prompt indicating the concept and the at least one image of the concept. In an embodiment, the weights include all weights of the text-to-image diffusion model. In another embodiment, the weights include a subset of weights of the text-to-image diffusion model.

Locking the activation of a component of the text-to-image diffusion model refers to forcing an output of the component in the pre-trained text-to-image diffusion model to remain unchanged while updating weights of the text-to-image diffusion model based on the at least one image of the concept. In other words, the output of the select component(s) is frozen during training of the text-to-image diffusion model to generate new images of the concept. It should be noted that while the super-category activation guides the locking process, the locking may not necessarily be exact, in an embodiment. In an embodiment, the activation of the select component(s) may be modulated before locking. In an embodiment, an attention map of the super category may be used to modulate the activation.

In an embodiment, updating the weights of the text-to-image diffusion model based on the at least one image of the concept may be repeated at least one additional time. In an embodiment, updating the weights may be repeated until a predefined goal is met. For example, the predefined goal may be determined by at least one scoring function. As another example, the predefined goal may be determined by at least two scoring functions. In this example, a first one of the scoring functions may be configured to measure an alignment between generated images and the at least one image input for the concept, and a second one of the scoring functions may be configured to measure an alignment between the generated images and an input text prompt.

To this end, the method 100 may employ component locking for personalization of the pre-trained text-to-image diffusion model. This method 100 can improve the fine-grained details of images generated for a personalized concept. This method 100 can also reduce the memory footprint update of the underlying model instead of full fine-tuning. Further, this method 100 can reduce catastrophic forgetting and leakage by locking select component(s) of the pre-trained text-to-image diffusion model during training of the model on the personalized concept.

Once the text-to-image diffusion model is trained to generate images of the new concept, in the manner described above, the text-to-image diffusion model may be deployed. In an embodiment, a given user input text indicating the new concept is processed by the personalized text-to-image diffusion model to generate an image corresponding to the user input text. The image may then be output for display to the user or may be output to another designated application.

It should be noted that the method 100 may be repeated any number of times to further personalize the text-to-image diffusion model on additional concepts. In an embodiment, the text-to-image diffusion model may then be used to generate images of combined concepts, including any combination of pre-trained concepts and/or newly trained concepts. For example, given a user input text that indicates at least two concepts, the personalized text-to-image diffusion model may process such input to generate an image that depicts a combination of the concepts per the user input text.

Further embodiments will now be provided in the description of the subsequent figures. It should be noted that the embodiments disclosed herein with reference to the method 100 of FIG. 1 may apply to and/or be used in combination with any of the embodiments of the remaining figures below.

FIG. 2 illustrates a flowchart of a method 200 for personalization of a text-to-image diffusion model using rank-one editing, in accordance with an embodiment. The method 200 may be used in combination with the method 100 of FIG. 1, in an embodiment. Further, the descriptions and/or definitions given above may equally apply to the present embodiment.

In operation 202, at least one image of a concept to be learned by a pre-trained text-to-image diffusion model is received as input. In an embodiment, the concept may be associated with a super category of concepts on which the text-to-image diffusion model has been pre-trained. However, other embodiments are contemplated in which the concept is not necessarily associated with a pre-trained super category of concepts.

In operation 204, the text-to-image diffusion model is trained to generate new images of the concept. With respect to the present embodiment, the training includes for at least one layer of the text-to-image diffusion model: propagating the input forward through the text-to-image diffusion model to determine a propagated input to the layer, propagating a defined output backward through the text-to-image diffusion model to determine a target output for the layer, and updating weights of the layer such that when the weights are applied to the propagated input a resulting output of the layer is more closely aligned with the target output (e.g. than would be if the weights were not updated).

In an embodiment, a single layer of the text-to-image diffusion model may be trained, per operation 204. In another embodiment, a plurality of layers of the text-to-image diffusion model may be trained per operation 204. In an embodiment, the layer(s) may be a linear projection layer in at least one cross attention module of the text-to-image diffusion model. In another embodiment, the layer(s) may be a kernel matrix of a convolutional layer in at least one cross attention module of the text-to-image diffusion model.

As mentioned, a layer is trained, in part, by propagating the input forward through the text-to-image diffusion model to determine a propagated input to the layer. The input that is propagated forward through the text-to-image diffusion model is the image(s) of the concept to be learned. The input may further include a text prompt from a user.

The propagated input refers to the specific input that is given to the layer being trained. In an embodiment, the propagated input is an output of a prior layer of the model (i.e. immediately preceding the layer being trained). Thus, as the user provided input is processed from an input of the text-to-image diffusion model forward through the model, the particular propagated input at the layer being trained is determined.

Additionally, the layer is trained, in part, by propagating a defined output backward through the text-to-image diffusion model to determine a target output for the layer. The defined output is an output defined for the entire the text-to-image diffusion model. The target output of the layer refers to the specific output of the layer being trained that would be given (as input) to an subsequent layer of the model. Accordingly, as the defined output is processed from the output of the text-to-image diffusion model backward through the model, the particular target output for the layer being trained is determined.

Still yet, the layer is trained, in part, by updating weights of the layer such that when the weights are applied to the propagated input a resulting output of the layer is more closely aligned with the target output. More closely aligned refers to the difference between the resulting output of the layer and the target output of the layer being reduced (i.e. from prior to the weights being updated). In an embodiment, updating the weights of the layer may depend on the target output for one or more words in the input text prompt. In an embodiment, updating the weights may be controlled based on a similarity between the input (given in operation 202) and the propagated input to the layer. In an embodiment, different updates to the weights may be trained for different ranges of denoising time stamps.

To this end, the method 200 is may employ rank-one editing for personalization of the pre-trained text-to-image diffusion model. Rank-one editing refers to the disclosed manner in which the weights of a given layer of the pre-trained text-to-image diffusion model are updated to personalize the model to a new concept input by a user. This method 200 can avoid a train-inference mismatch which would otherwise degrade the fidelity of the reconstructed concept generated by the model. This method 200 can also enable the personalized text-to-image diffusion model to combine individually learned concepts at inference time.

Once the text-to-image diffusion model is trained to generate images of the new concept, in the manner described above, the text-to-image diffusion model may be deployed. In an embodiment, a given user input text indicating the new concept is processed by the personalized text-to-image diffusion model to generate an image corresponding to the user input text. The image may then be output for display to the user or may be output to another designated application.

FIG. 3 illustrates a flowchart of a method 300 for personalization of a text-to-image diffusion model using a weighed loss, in accordance with an embodiment. The method 300 may be used in combination with the method 100 of FIG. 1 and/or the method 200 of FIG. 2, in embodiments. Further, the descriptions and/or definitions given above may equally apply to the present embodiment.

In operation 302, at least one image of a concept to be learned by a pre-trained text-to-image diffusion model is received as input. In an embodiment, the concept may be associated with a super category of concepts on which the text-to-image diffusion model has been pre-trained. However, other embodiments are contemplated in which the concept is not necessarily associated with a pre-trained super category of concepts.

In operation 304, the text-to-image diffusion model is trained to generate new images of the concept, including while updating weights of the text-to-image diffusion model based on the at least one image of the concept, a standard conditional diffusion loss is weighed by a soft segmentation mask. In embodiments, the text-to-image diffusion model may be trained, and accordingly the weights may be updated, in accordance with the method 100 of FIG. 1 and/or the method 200 of FIG. 2.

As mentioned, while updating the weights during training of the text-to-image diffusion model, the standard conditional diffusion loss for the training is weighed by a soft segmentation mask. In an embodiment, the soft segmentation mask is attained from a zero-shot image segmentation model. In an embodiment, values in the mask may be normalized by their maximum value.

FIG. 4 illustrates a block diagram of the architecture for personalizing a text-to-image diffusion model, in accordance with an embodiment. The architecture of the present embodiment is configured to provide both component locking and rank-one editing. In an embodiment, the architecture may be implemented in the context of at least the method 100 of FIG. 1 and the method 200 of FIG. 2.

It should be noted that while the component locking feature of the present embodiment is disclosed with respect to a Key component specifically, other implementations of the architecture are contemplated in which other components may be locked, as described with respect to the method 100 of FIG. 1.

As shown, a prompt is transformed by a text encoder into a sequence of encodings e. Each encoding is input to a set of cross-attention modules of a diffusion U-Net denoiser. The zoomed-in cross-attention module shows how the Key and Value pathways are conditioned on the text encoding. The Key drives the attention map, which then modulates the Value pathway.

Figure 5:
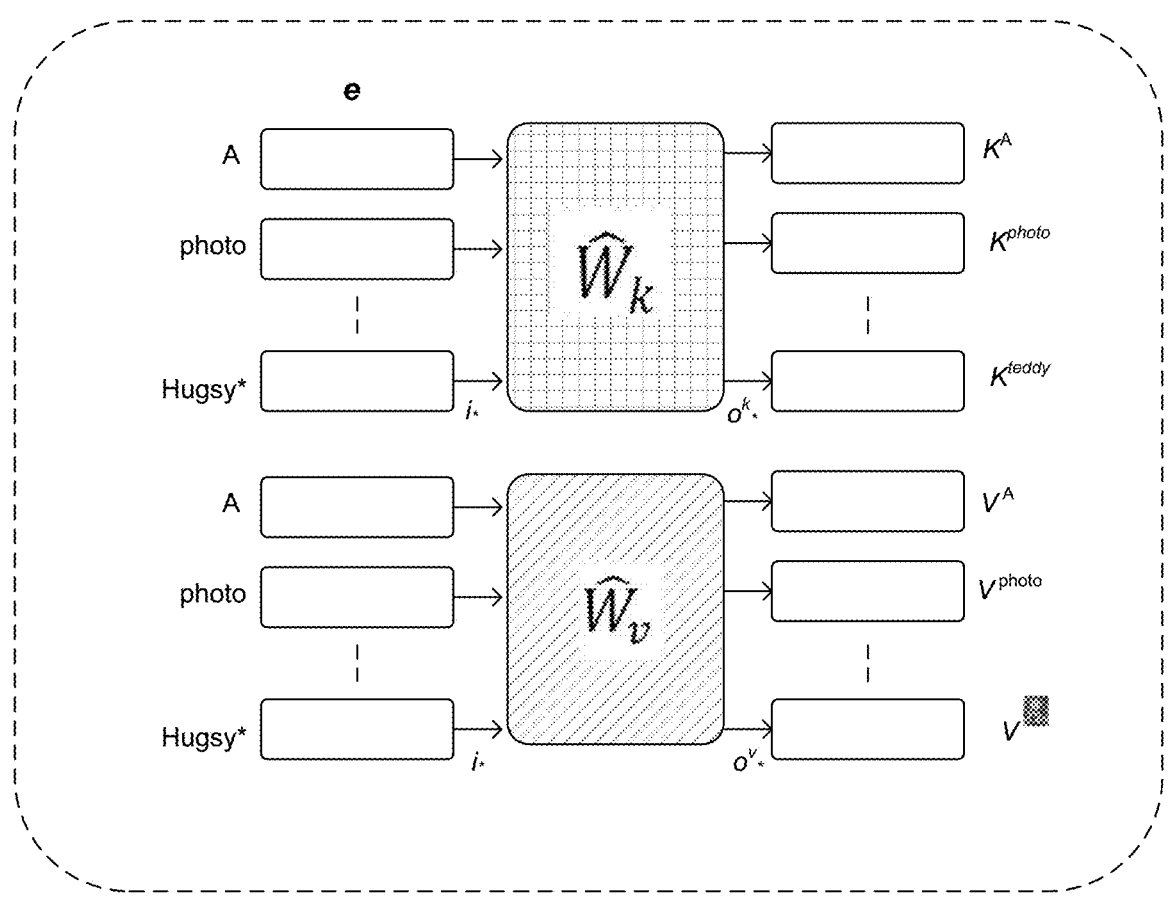
FIG. 5 illustrates a block diagram of the components of FIG. 4 that provide rank-one editing to personalize the text-to-image diffusion model, in accordance with an embodiment.

Whenever the encoding contains the target concept to be learned ("Hugsy" in the example shown), the architecture ensures that its cross-attention keys match those of its super category, which is referred to as Key Locking. Additionally, the cross-attention values are configured to represent the concept in the multi-resolution latent space, as shown in FIG. 5. In particular, FIG. 5 illustrates that given image examples of the teddy bear named Hugsy, when the encoding includes "Hugsy" the V projection emits a concept-specific code, while the K projection is targeted to emit keys for the super category Kteddy.

Training End-to-End to Address Train-Test Mismatch

To address any mismatch between training and inference resulting from training that optimizes only the target-output $o_*$ associated with one specific entry in a prompt, the architecture is configured such that the target-output optimization and matrix update occur together during training. The network learns to account for any effects on other prompt-parts, avoiding the train-inference mismatch.

To do so, the weight update is written to characterize the output h of layer $\hat{W}$ when presented with an input $e_m$. This yields the formula in Equation 1.

$$h = We_m^{\perp} + o_* sim(i_*, e_m)/\|i_*\|_{C-1}^2 \qquad \text{Equation 1}$$

Here, $$sim(i_*, e_m) := i_*^T(C^{-1})e_m$$

measures the similarity of $e_m$ with $i_*$ in a metric space defined by $$C^{-1}, \|i_*\|_{C-1}^2 := sim(i_*, i_*)$$

measures the energy of $i_*$ in the same metric space, and $$e_m^{\perp} := e_m - i_* sim(i_*, e_m)/\|i_*\|_{C-1}^2$$

is the component of $e_m$ that is orthogonal to $i_*$ in the metric space. Intuitively, the right additive term in Equation 1 maps the $i_*$ component of the word encoding ($e_m$) to $o_*$. The left term nulls the $i_*$ component from the word encoding and maps the remaining using the pretrained matrix W.

Given this characterization, the forward pass of each layer is replaced by updating it using Equation 1 as the layer's forward pass. This ensures that the same update expression is used for both training and inference, eliminating the mismatch. Combined with an online estimation of $i_*$ (described below), it enables end-to-end training.

Using Gated Rank-1 Update for Combining Concepts

Combining individually learned concepts at inference time is a hard challenge. To address this challenge, a gating mechanism is used to selectively allow or attenuate the influence of each concept on the layer output. Note that the update rule of Equation 1 already includes a linear gating mechanism $$sim(e_m, i_*)/\|i_*\|_{C-1}^2,$$

which is close to 1 when $e_m = i_*$. However, lower similarity values may not be sufficiently attenuated. Therefore, the influence of sim is increased by wrapping the $$sim(e_m, i_*)/\|i_*\|_{C-1}^2$$

value with a sigmoid function, which has hyper-parameters for bias and temperature. This way, the weight updates are sharply concentrated on inputs that strongly correspond to the personalized concept.

Therefore, the forward pass of each layer update during both training and inference time of a single concept is given per Equation 2.

$$h = We_m^{\perp} + o_* \sigma\left(\frac{sim(i_*, e_m)/\|i_*\|_{C^{-1}}^2 - \beta}{\tau}\right)$$

Equation 2

$\sigma$ is a sigmoid activation function, $\tau$ is the temperature and $\beta$ a bias term. This implementation ensures that weight updates are only applied to encoding components that align (parallel) with $i_*$, i.e. those belonging to the new concept, or influenced by it.

This non-linear gating mechanism therefore provides two important benefits: First, it allows us to better separate the influence of individually learned concepts during inference time. Second, even for a single concept, it allows for inference-time control over the influence of the concept. By adjusting the values of the sigmoid hyper-parameters, the bias and the temperature, visual fidelity can be traded with textual alignment and vice-versa.

Figure 6:
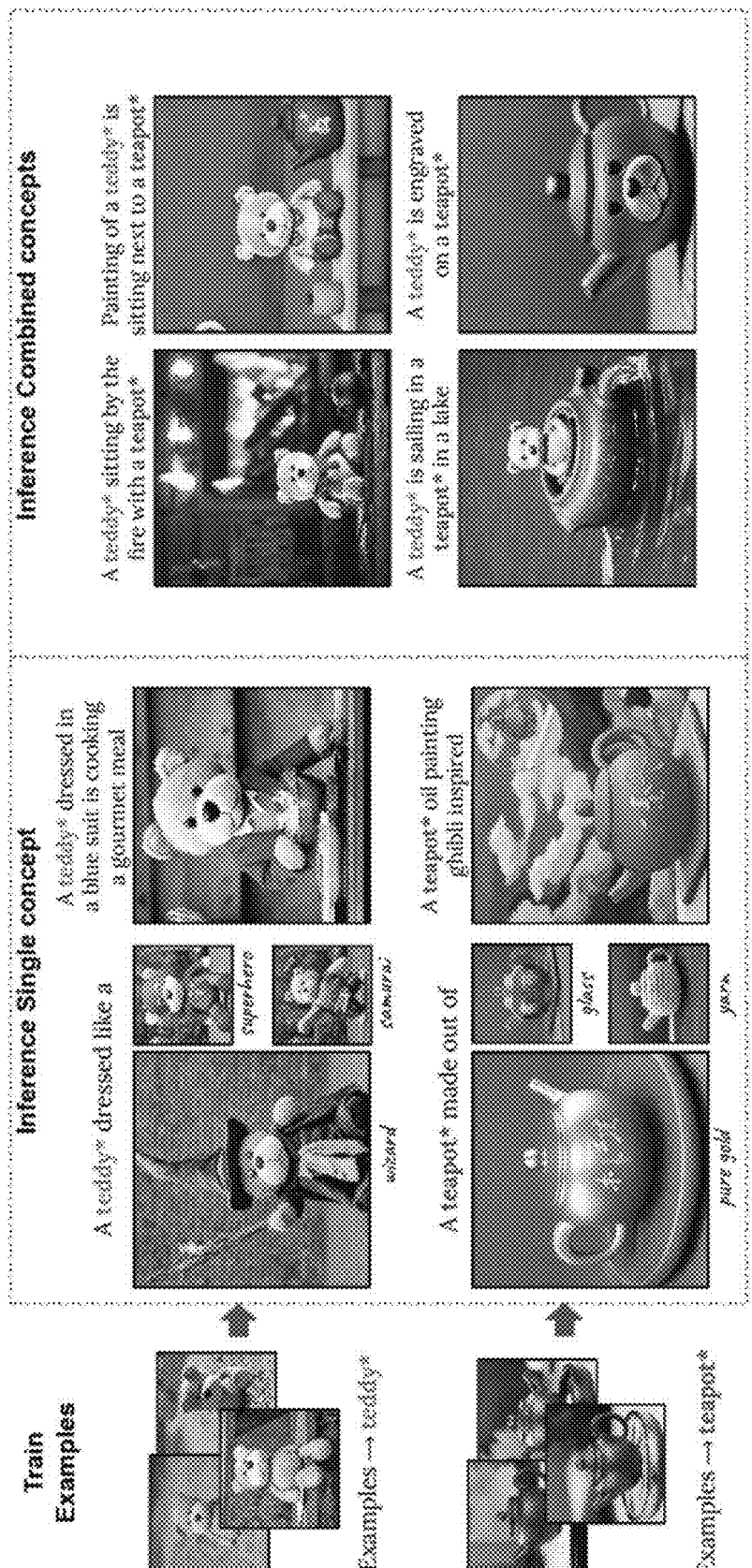
FIG. 6 illustrates exemplary input and output of a personalized text-to-image diffusion model, in accordance with an embodiment.

FIG. 6 illustrates exemplary input and output of a personalized text-to-image diffusion model personalized, in accordance with an embodiment.

Inference

Single concept: For inference with a single trained concept, Equation 2 is applied to the forward pass of each edited cross-attention layer. The strength of the depicted concept can be controlled by changing the values of the sigmoid's $\tau$ and $\beta$ at inference time.

Combining multiple concepts: To combine concepts that were trained in isolation, we Equation 2 is extended to include multiple concepts $$\{i_*^j, o_*^j\}_{j \in 1..J}.$$

For that, $$e_m^{\perp}$$

is generalized to be orthogonal to the sub-space spanned by all the $$\{i_*^j\}_{j \in 1..J}$$

in the metric space, which is denoted as $$ee_m^{\perp,J}.$$

for the right term, the gated responses from all the concepts are summed. The final expression is illustrated in Equation 3.

$$h = We_m^{\perp,J} + \sum_{j \in 1...J} o_*^j \sigma\left(\frac{sim(i_*^j, e_m)/\|i_*^j\|^2 - \beta_j}{\tau}\right)$$

Equation 3

$$e_m^{\perp,J} = e_m - \sum_{j \in 1..J} u_j sim(u_j, e_m),$$

and $u_j$ relates to a basis vector in the metric space, after being projected back to the text encoder space by an inverse Cholesky root $L^{T-1}$.

Global Key-Locking: Key-Locking ensures that a concept's Key is correctly aligned with its super concept. However, it does not ensure that the text-encoder handles the concept in the same way it would have handled the super concept and its correlations to the other words in the encoding. An inference time method is provided to align Key-locked concepts to an entire prompt. This variant is referred to as global key-locking, as opposed to the local key locking disclosed in the embodiments above.

Global key-locking includes:

(1) Given a key-locked trained concept and a prompt that includes it, a forward pass is made through the text encoder and the K and V sequence activations that this prompt elicits are calculated, denoted by K and V respectively.

(2) The concept word in the prompt is replaced by its superclass word and another forward pass is made through the text encoder. This time, only the K sequence activations that the super-class prompt elicits are calculated, denoted by $\tilde{K}$.

(3) K is overridden with $\tilde{K}$ and the image is sampled as usual.

This embodiment is referred to as global key-locking because it locks the K pathway of the entire prompt.

Online estimation of $i_*$: The following exponential moving average expression may be used to estimate $i_*$ during training time: $i_* := 0.99 i_* + 0.01 e_{concept}$ where $e_{concept}$ corresponds to encoding of the concept word at the output of the text encoder.

Zero-Shot Weighting Loss: Training with few image examples is prone to learning spurious correlations from the image background. To decorrelate the concept from its background the standard conditional diffusion loss is weighed by a soft segmentation mask attained from a zero-shot image segmentation model. Mask values are normalized by their maximum value.

Application to multiple layers: For each concept a single word is chosen for a super category name. That word is used to initialize its word embeddings and treat the embeddings as learned parameters. Rank-one editing, as disclosed in the embodiments above, is applied to all cross-attention layers of the U-Net denoiser. For each of the K pathway layers (1), the $$o_*^{K;l}$$

is precomputed and frozen to be $$o_*^{K;l} = W_K^l e_{superclass}$$

with a prompt saying "A photo of a <superclass_word>", and $i_*$ is updated as training progresses. On each of the V pathway layers, $$o_*^{V;l}$$

is treated as learned parameters.

FIG. 6 illustrates exemplary input and output of a personalized text-to-image diffusion model, in accordance with an embodiment. The personalized text-to-image diffusion model may be trained per one or more of the embodiments disclosed above. The present embodiment illustrates use of the personalized text-to-image diffusion model during inference time.

As shown, the personalized text-to-image diffusion model enables image generation for personalized concepts. The images may be generated with large changes in appearance, pose, and/or context for those personalized concepts, without compromising identity. The personalized text-to-image diffusion model, when trained according to the embodiments described above, may be compact (e.g. of only 100 KB per concept).

As also shown, the personalized text-to-image diffusion model can also combine learned concepts at inference time. This may include creating scenes which portray multiple concepts side-by-side. This may also include creating scenes with interactions between the multiple concepts.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 715 for a deep learning or neural learning system are provided below in conjunction with FIGS. 7A and/or 7B.

In at least one embodiment, inference and/or training logic 715 may include, without limitation, a data storage 701 to store forward and/or output weight and/or input/output data corresponding to neurons or layers of a neural network trained and/or used for inferencing in aspects of one or more embodiments. In at least one embodiment data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 701 may be included with other on-chip or off-chip data storage, including a processor's L1, L2, or L3 cache or system memory.

In at least one embodiment, any portion of data storage 701 may be internal or external to one or more processors or other hardware logic devices or circuits. In at least one embodiment, data storage 701 may be cache memory, dynamic randomly addressable memory ("DRAM"), static randomly addressable memory ("SRAM"), non-volatile memory (e.g., Flash memory), or other storage. In at least one embodiment, choice of whether data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a data storage 705 to store backward and/or output weight and/or input/output data corresponding to neurons or layers of a neural network trained and/or used for inferencing in aspects of one or more embodiments. In at least one embodiment, data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 705 may be included with other on-chip or off-chip data storage, including a processor's L1, L2, or L3 cache or system memory. In at least one embodiment, any portion of data storage 705 may be internal or external to on one or more processors or other hardware logic devices or circuits. In at least one embodiment, data storage 705 may be cache memory, DRAM, SRAM, non-volatile memory (e.g., Flash memory), or other storage. In at least one embodiment, choice of whether data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 701 and data storage 705 may be separate storage structures. In at least one embodiment, data storage 701 and data storage 705 may be same storage structure. In at least one embodiment, data storage 701 and data storage 705 may be partially same storage structure and partially separate storage structures. In at least one embodiment, any portion of data storage 701 and data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710 to perform logical and/or mathematical operations based, at least in part on, or indicated by, training and/or inference code, result of which may result in activations (e.g., output values from layers or neurons within a neural network) stored in an activation storage 720 that are functions of input/output and/or weight parameter data stored in data storage 701 and/or data storage 705. In at least one embodiment, activations stored in activation storage 720 are generated according to linear algebraic and or matrix-based mathematics performed by ALU(s) 710 in response to performing instructions or other code, wherein weight values stored in data storage 705 and/or data 701 are used as operands along with other values, such as bias values, gradient information, momentum values, or other parameters or hyperparameters, any or all of which may be stored in data storage 705 or data storage 701 or another storage on or off-chip. In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 701, data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM. Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7A:
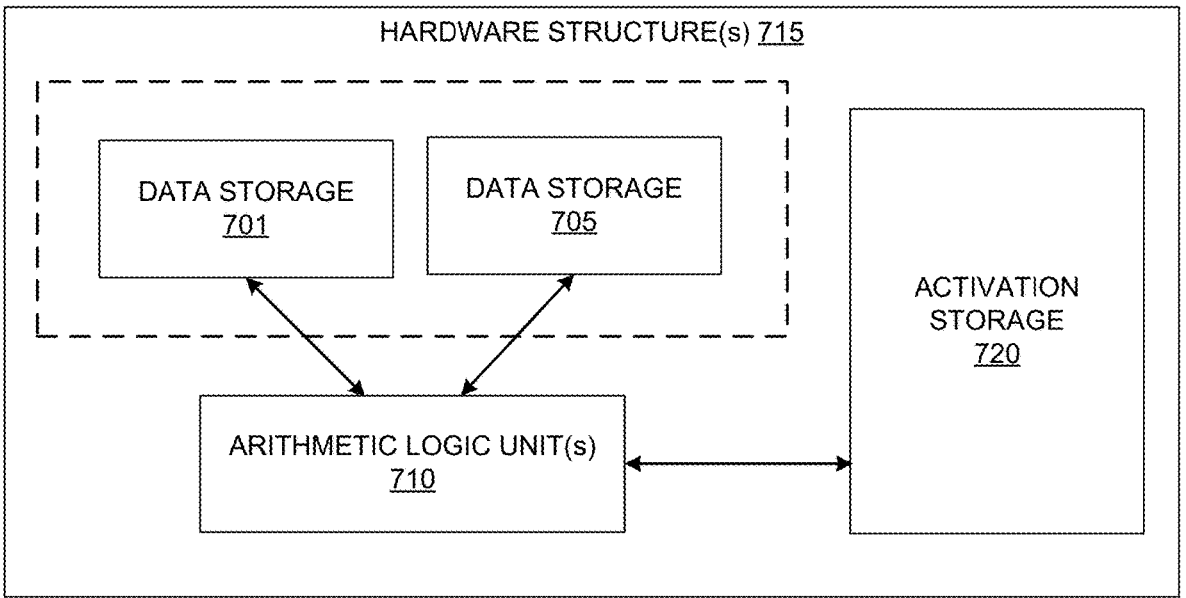
FIG. 7A illustrates inference and/or training logic, according to at least one embodiment.
Figure 7B:
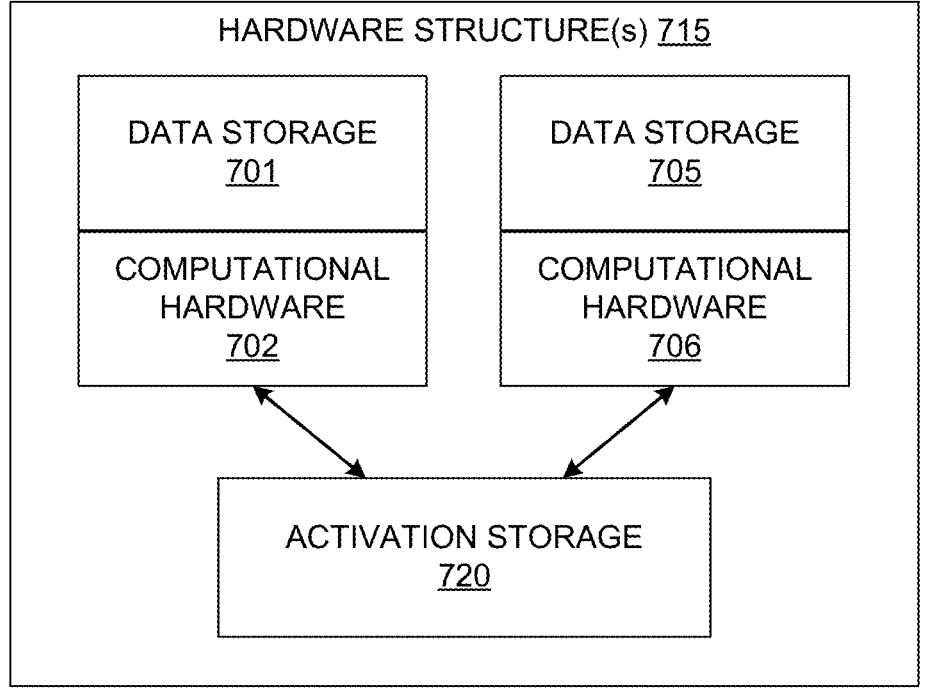
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, data storage 701 and data storage 705, which may be used to store weight values and/or other information, including bias values, gradient information, momentum values, and/or other parameter or hyperparameter information. In at least one embodiment illustrated in FIG. 7B, each of data storage 701 and data storage 705 is associated with a dedicated computational resource, such as computational hardware 702 and computational hardware 706, respectively. In at least one embodiment, each of computational hardware 706 comprises one or more ALUs that perform mathematical functions, such as linear algebraic functions, only on information stored in data storage 701 and data storage 705, respectively, result of which is stored in activation storage 720.

In at least one embodiment, each of data storage 701 and 705 and corresponding computational hardware 702 and 706, respectively, correspond to different layers of a neural network, such that resulting activation from one "storage/computational pair 701/702" of data storage 701 and computational hardware 702 is provided as an input to next "storage/computational pair 705/706" of data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Neural Network Training and Deployment

Figure 8:
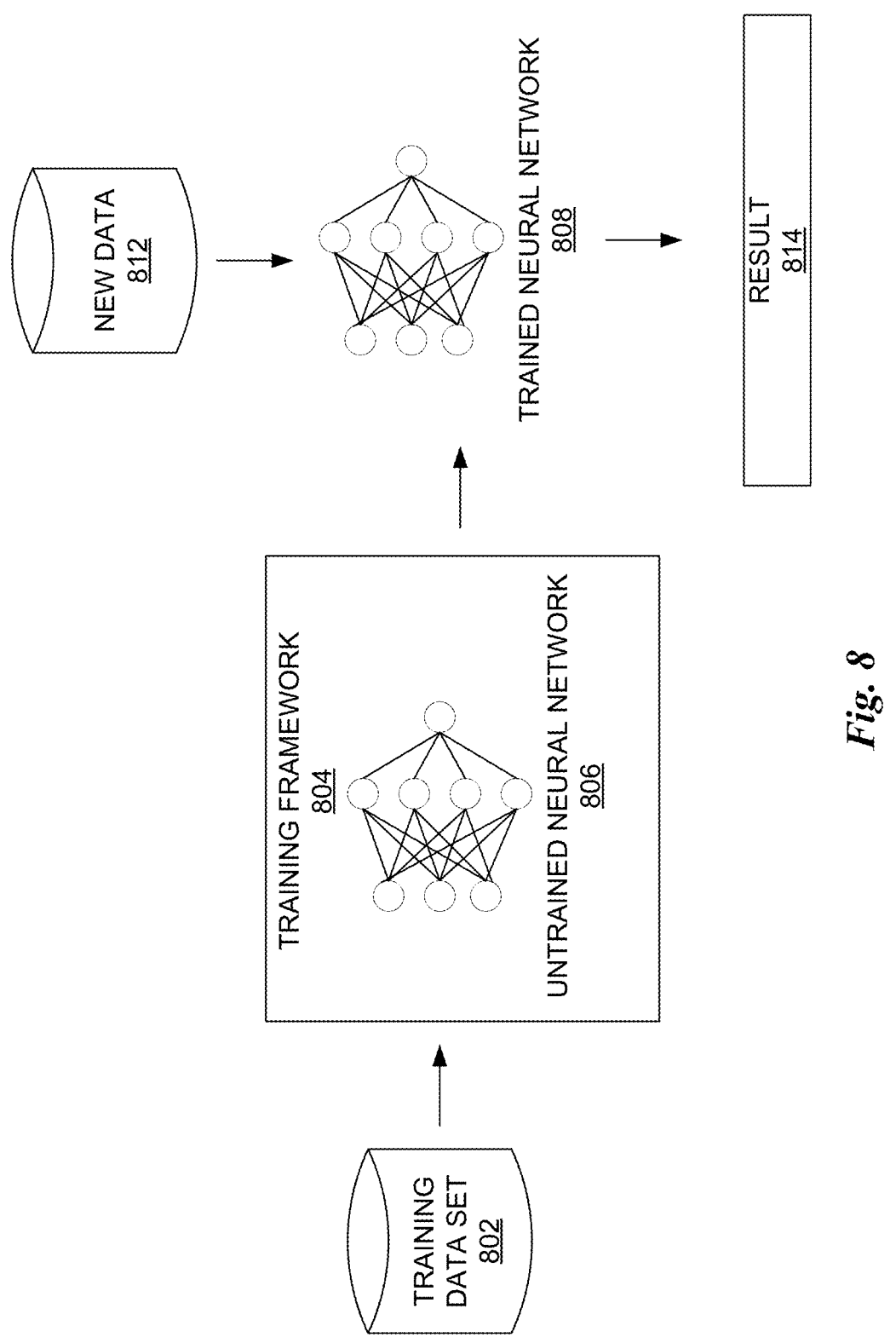
FIG. 8 illustrates training and deployment of a neural network, according to at least one embodiment.

FIG. 8 illustrates another embodiment for training and deployment of a deep neural network. In at least one embodiment, untrained neural network 806 is trained using a training dataset 802. In at least one embodiment, training framework 804 is a PyTorch framework, whereas in other embodiments, training framework 804 is a Tensorflow, Boost, Caffe, Microsoft Cognitive Toolkit/CNTK, MXNet, Chainer, Keras, Deeplearning4j, or other training framework. In at least one embodiment training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having known output and the output of the neural network is manually graded. In at least one embodiment, untrained neural network 806 is trained in a supervised manner processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on known input data, such as new data 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map, which is a type of trained neural network 808 capable of performing operations useful in reducing dimensionality of new data 812. In at least one embodiment, unsupervised training can also be used to perform anomaly detection, which allows identification of data points in a new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new data 812 without forgetting knowledge instilled within network during initial training.

Data Center

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920, one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

As described herein, a method, computer readable medium, and system are disclosed to personalize text-to-image diffusion models. In accordance with FIGS. 1-6, embodiments may provide text-to-image diffusion models usable for performing inferencing operations and for providing inferenced data. The text-to-image diffusion models may be stored (partially or wholly) in one or both of data storage 701 and 705 in inference and/or training logic 715 as depicted in FIGS. 7A and 7B. Training and deployment of the text-to-image diffusion models may be performed as depicted in FIG. 8 and described herein. Distribution of the text-to-image diffusion models may be performed using one or more servers in a data center 900 as depicted in FIG. 9 and described herein.

What is claimed is:

1. A method, comprising:
at a device:
receiving as input at least one image of a concept to be learned by a pre-trained text-to-image diffusion model, wherein the concept is associated with a super category of concepts on which the text-to-image diffusion model has been pre-trained; and
training the text-to-image diffusion model to generate new images of the concept, including:
computing an activation of at least one select component of the text-to-image diffusion model for the super category based upon an input text prompt indicating the super category, and
while locking the activation of the at least one select component, updating weights of the text-to-image diffusion model based on an input text prompt indicating the concept and the at least one image of the concept.

2. The method of claim 1, wherein the input includes a plurality of images of the concept.

3. The method of claim 1, where the super category includes a description of the super category.

4. The method of claim 1, wherein the input includes a single image of the concept.

5. The method of claim 1, wherein the activation of the at least one select component is the activation at an output of a K matrix of a cross-attention module of the text-to-image diffusion model.

6. The method of claim 1, wherein the select component is activity at an output of a feed-forward layer of a cross-attention module of the text-to-image diffusion model.

7. The method of claim 1, wherein updating the weights of the text-to-image diffusion model based on the at least one image of the concept is repeated at least one additional time.

8. The method of claim 7, wherein updating the weights is repeated until a predefined goal is met.

9. The method of claim 8, wherein the predefined goal is determined by at least one scoring function.

10. A method, comprising:

at a device:

receiving as input at least one image of a concept to be learned by a pre-trained text-to-image diffusion model, wherein the concept is associated with a super category of concepts on which the text-to-image diffusion model has been pre-trained; and training the text-to-image diffusion model to generate new images of the concept, including:

computing an activation of at least one select component of the text-to-image diffusion model for the super category, and while locking the activation of the at least one select component, updating weights of the text-to-image diffusion model based on the at least one image of the concept, wherein updating the weights of the text-to-image diffusion model based on the at least one image of the concept is repeated at least one additional time until a predefined goal is met, wherein the predefined goal is determined by at least two scoring functions, wherein a first scoring function of the at least two scoring functions measures an alignment between generated images and the at least one image input for the concept, and wherein a second scoring function of the at least two scoring functions measures an alignment between the generated images and an input text prompt.

11. A method, comprising:

at a device:

receiving as input at least one image of a concept to be learned by a pre-trained text-to-image diffusion model, wherein the concept is associated with a super category of concepts on which the text-to-image diffusion model has been pre-trained; and training the text-to-image diffusion model to generate new images of the concept, including:

computing an activation of at least one select component of the text-to-image diffusion model for the super category, and while locking the activation of the at least one select component, updating weights of the text-to-image diffusion model based on the at least one image of the concept, wherein the activation is modulated before locking.

12. The method of claim 11, wherein an attention map of the super category is used to modulate the activation.

13. A method, comprising:

at a device:

receiving as input at least one image of a concept to be learned by a pre-trained text-to-image diffusion model; and training the text-to-image diffusion model to generate new images of the concept, including:

while updating weights of the text-to-image diffusion model based on the at least one image of the concept, a standard conditional diffusion loss is weighed by a soft segmentation mask.

14. The method of claim 13, wherein the soft segmentation mask is attained from a zero-shot image segmentation model.

15. The method of claim 13, wherein values in the soft segmentation mask are normalized by their maximum value.

16. A system, comprising:

a non-transitory memory storage comprising instructions; and one or more processors in communication with the memory, wherein the one or more processors execute the instructions to:

receive as input at least one image of a concept to be learned by a pre-trained text-to-image diffusion model, wherein the concept is associated with a super category of concepts on which the text-to-image diffusion model has been pre-trained; and train the text-to-image diffusion model to generate new images of the concept, including:

computing an activation of at least one select component of the text-to-image diffusion model for the super category, and while locking the activation of the at least one select component, updating weights of the text-to-image diffusion model based on the at least one image of the concept.

17. The system of claim 16, wherein the select component is activity at an output of a feed-forward layer of a cross-attention module of the text-to-image diffusion model.

18. The system of claim 16, wherein the activation of the at least one select component is computed based upon an input text prompt indicating the super category, and wherein the weights of the text-to-image diffusion model are updated, while locking the activation of the at least one select component, based upon an input text prompt indicating the concept and the at least one image of the concept.

19. A non-transitory computer-readable media storing computer instructions which when executed by one or more processors of a device cause the device to:

receive as input at least one image of a concept to be learned by a pre-trained text-to-image diffusion model, wherein the concept is associated with a super category of concepts on which the text-to-image diffusion model has been pre-trained; and train the text-to-image diffusion model to generate new images of the concept, including:

computing an activation of at least one select component of the text-to-image diffusion model for the super category, and while locking the activation of the at least one select component, updating weights of the text-to-image diffusion model based on the at least one image of the concept.

20. The non-transitory computer-readable media of claim 19, wherein the activation of the at least one select component is computed based upon an input text prompt indicating the super category, and wherein the weights of the text-to-image diffusion model are updated, while locking the activation of the at least one select component, based upon an input text prompt indicating the concept and the at least one image of the concept.

21. The non-transitory computer-readable media of claim 19, wherein updating the weights of the text-to-image diffusion model based on the at least one image of the concept is repeated until a predefined goal is met, and wherein the predefined goal is based on an alignment between generated images and the at least one image input for the concept, and an alignment between the generated images and an input text prompt.

* * * * *